M. E. DORSCH.
ANIMAL TRAP.
APPLICATION FILED FEB. 13, 1918. RENEWED JAN. 30, 1919.
1,305,075.
Patented May 27, 1919.
2 SHEETS—SHEET 2.
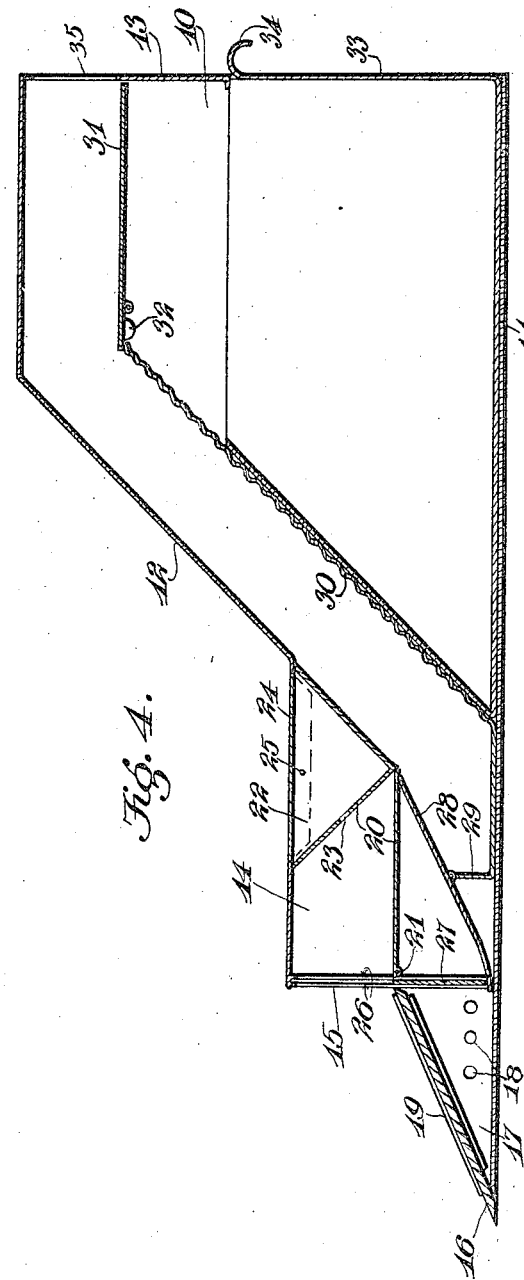
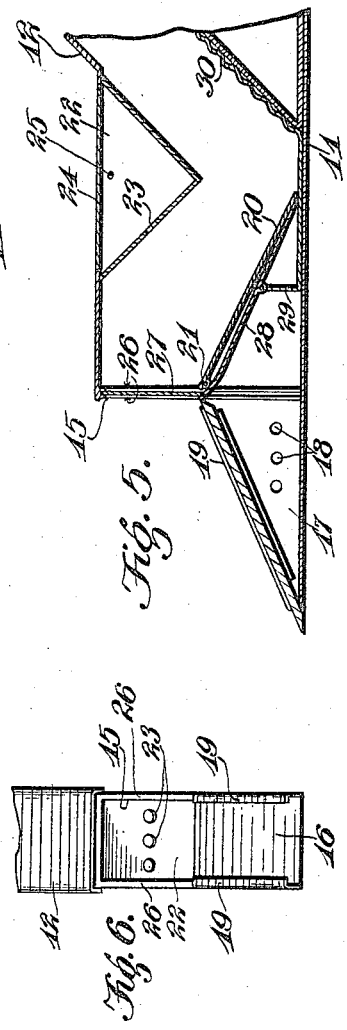
Max E. Dorsch
INVENTOR.
BY
ATTORNEYS.

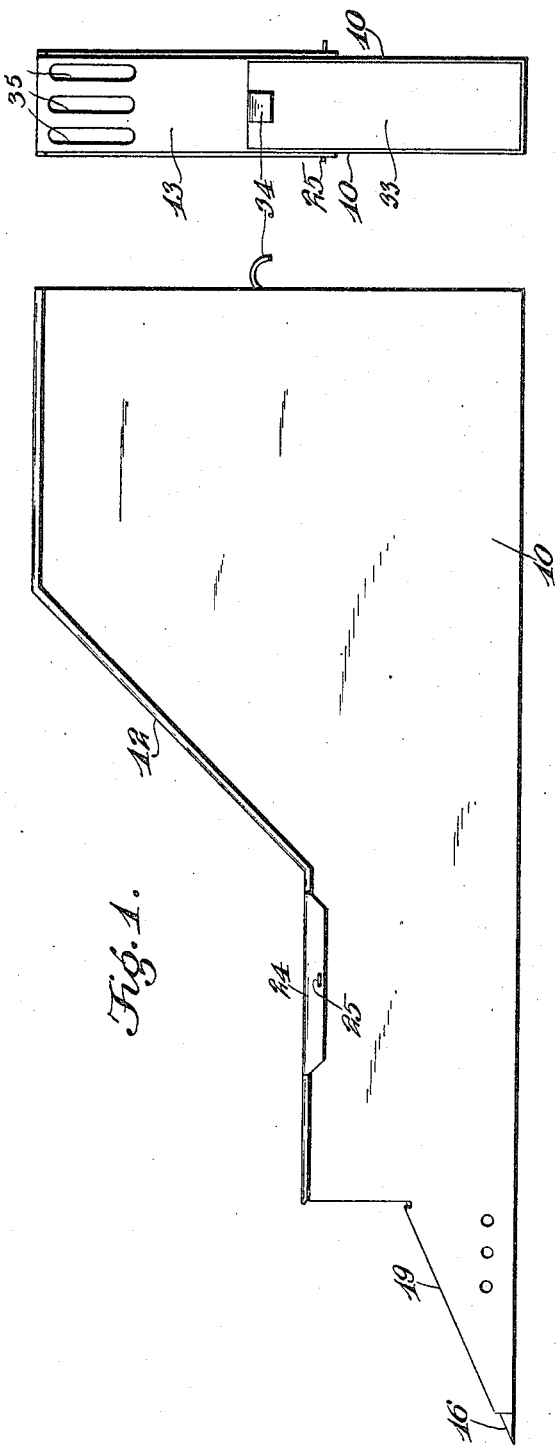

UNITED STATES PATENT OFFICE.

MAX E. DORSCH, OF CHICAGO, ILLINOIS.

ANIMAL-TRAP.

1,305,075. Specification of Letters Patent. Patented May 27, 1919.

Application filed February 13, 1918, Serial No. 216,877. Renewed January 30, 1919. Serial No. 274,107.

*To all whom it may concern:*

Be it known that I, MAX E. DORSCH, a citizen of the United States, residing at Chicago, in the county of Cook and State of Illinois, have invented new and useful Improvements in Animal-Traps, of which the following is a specification.

This invention relates to animal traps in which the entrance to the trap has a gate or other closure which is normally open but which closes when the animal passes the same, and then opens again as the animal passes a certain point in the trap, the retreat of the victim being now cut off by a second gate or closure, and the trap being ready and reset for the next victim.

The invention has for its object to provide a simple and efficient trap of the kind stated, and to this end it consists in a novel combination and arrangement of parts to be hereinafter described and claimed.

In order that the invention may be better understood, reference is had to the accompanying drawings forming a part of this specification, and in said drawings, Figure 1 is a side elevation of the trap;

Fig. 2 is a rear end view thereof;

Fig. 3 is a plan view;

Fig. 4 is a central longitudinal section of the trap;

Fig. 5 is a fragment of the sectional view shown in Fig. 4, with the parts in another position, and Fig. 6 is a front end view of a fragment of the trap.

Referring specifically to the drawings the casing of the trap comprises sidewalls 10, a bottom 11, an inclined front wall 12 and a rear wall 13. The front portion of the casing is provided at the bottom with an entrance chamber 14 having an entrance opening 15 to which an inclined runway 16 leads. Beneath this runway is a bait chamber 17 having openings 18 in its sidewalls for the escape of the odor of the bait. The purpose of this bait chamber is to attract the animal to the trap.

The runway 16 is a wooden board which is removably mounted under guide flanges 19 formed by bending over the forward inclined edges of the sidewalls of the chamber 17. The runway therefore forms the front wall of the bait chamber 17, and as it can be slid under the flanges 19, said chamber is readily accessible for insertion of the bait.

The bait chamber 17 is below the entrance chamber 14 and is separated therefrom by a horizontal platform 20 hinged at its front end, as shown at 21, so that it may tilt downwardly.

In the rear end of the chamber 14 is a hopper-like bait receptacle 22 against which the rear, free end of the platform 20 abuts so that said platform can tilt downward only. The inclined front wall of the receptacle forms a barrier extending across the rear end of the chamber, and has odor-escape holes 23, and the top of the receptacle is provided with a removable lid 24 held in place by a cross pin 25 passing through depending side flanges on the lid.

The edges of the entrance opening 15 are provided with guides 26 in which is mounted a vertically slidable gate 27. These guides also extend down into the bait chamber 17, and the gate is normally down, out of the opening 15, and extending across the rear of said bait chamber to form a closure therefor.

Beneath the platform 20 is a vertically tiltable gate-operating plate 28, the same being pivoted intermediate its ends to a suitable support 29 rising from the bottom 11 of the trap. The forward end of the plate 28 extends beneath the gate 27 and is in contact therewith, and its rear end engages the rear portion of the platform 20. The gate 27 is normally down, leaving the opening 15 unobstructed, and in this position of the gate, the plate 28 has an upward slant toward its rear end, said end engaging the platform 20, as shown in Fig. 4. The platform 20 is now extending horizontally from the opening 15, with its rear end bearing against the bottom of the bait hopper 22.

The animal, ascending the runway 16, enters the trap through the opening 15 and steps on the platform 20 in attempting to pass rearward, being attracted in this direction by the bait in the hopper 22. The weight of the animal causes the platform to tilt, with the result that the animal is precipitated into that portion of the trap to the rear of the chamber 14. When the platform tilts it presses down on the rear end of the plate 28, and said plate tilts in a direction to slide the gate 27 upward into the opening 15, as shown in Fig. 5, so that the animal now can not retreat. As soon as the animal clears the platform, the weight of the gate 27 causes it to slide downward, whereby the plate 28 is tilted back to restore the platform to the normal position shown in Fig. 4, and as the plate 28 now extends between the bottom 11 of the trap and the rear end of the platform, and the latter engages the bottom of the hopper 22, said plate acts as a barrier to prevent retreat of the animal. The trap is now reset ready for the next victim.

Back of the parts just described, the trap has an inclined runway 30 leading to a tiltable platform 31 counter weighted at one end as shown at 32. Below this platform is located a water receptacle 33 housed in the rear portion of the trap casing. The rear wall 13 of the casing has an opening for insertion and removal of the water receptacle, and the latter has a suitable handle 34. The wall 13, above the water receptacle, has openings 35 to admit light to the platform 31 and the top of the runway 30, thereby attracting the animal.

The animal entering the trap as hereinbefore described, mounts the runway 30 and upon stepping on the platform 32 tilts the latter and is precipitated into the receptacle 33. It will be noted that the runway is corrugated to give the animal a better foothold.

I claim:

1. A trap having an entrance chamber provided with an entrance opening, a tiltable platform extending inwardly from the opening into the chamber and forming the floor thereof, a barrier across the chamber at the rear end of the platform, a tiltable member loosely engageable with and actuated by the platform, and a slidable gate for the aforesaid entrance opening, and engageable by the tiltable member, said gate being normally out of the opening, and moving thereinto when the tiltable member is actuated by the tilting of the platform.

2. A trap having an entrance chamber provided with an entrance opening, a tiltable platform extending inwardly from the opening into the chamber and forming the floor thereof, a barrier across the chamber at the rear end of the platform, a slidable gate movable into and out of the entrance opening, and a tiltable member pivoted intermediate its ends and loosely engageable at one end by the platform and at the other end by the gate.

3. A trap having an entrance chamber provided with an entrance opening, a tiltable platform extending inwardly from the opening into the chamber and forming the floor thereof, a barrier across the chamber at the rear end of the platform, a slidable gate movable into and out of the entrance opening, and a tiltable member extending normally at an incline between the bottom of the gate and the free end of the platform, and loosely engageable thereby, said member being pivoted intermediate its ends.

4. A trap having an entrance chamber provided with an entrance opening, a tiltable platform behind the opening, a barrier across the chamber at the rear end of the platform, a slidable gate movable into and out of the entrance opening, and a tiltable barrier extending between the bottom of the trap and the free end of the platform, and pivoted intermediate its ends, one end of the barrier being engageable by the gate and the other end by the platform.

5. A trap having an entrance chamber provided with an entrance opening, a tiltable platform behind the opening, a barrier across the chamber at the rear end of the platform, a tiltable member engageable with and actuated by the platform, a slidable gate for the aforesaid entrance opening, and engageable by the tiltable member, said gate being normally out of the opening, and moving thereinto when the tiltable member is actuated by the tilting of the platform, a runway leading to the entrance opening, and a bait chamber beneath the runway closed by the aforesaid gate when it is out of the opening.

6. A trap having an entrance chamber provided with an entrance opening, a tiltable platform behind the opening, a barrier across the chamber at the rear end of the platform, a bait chamber behind the barrier, a tiltable member engageable with and actuated by the platform, and a slidable gate for the aforesaid entrance opening, and engageable by the tiltable member, said gate being normally out of the opening, and moving thereinto when the tiltable member is actuated by the tilting of the platform.

In testimony whereof I affix my signature.

MAX E. DORSCH.

Copies of this patent may be obtained for five cents each, by addressing the "Commissioner of Patents, Washington, D. C."